United States Patent [19]
Brey

[11] 3,765,987
[45] Oct. 16, 1973

[54] TIRE BUILDING APPARATUS
[75] Inventor: Wilhelm Brey, Cuyahoga Falls, Ohio
[73] Assignee: Intercole Automation, Inc., Cleveland, Ohio
[22] Filed: Aug. 5, 1970
[21] Appl. No.: 61,226

[52] U.S. Cl.............................. 156/415, 156/418
[51] Int. Cl........................................... B29h 17/16
[58] Field of Search.................. 156/415, 414, 418, 156/417

[56] References Cited
UNITED STATES PATENTS

| | | | |
|---|---|---|---|
| 2,558,684 | 6/1951 | Haase | 156/418 |
| 2,339,543 | 1/1944 | Bishop | 156/415 |
| 3,188,260 | 6/1965 | Nebout | 156/415 |
| 3,485,692 | 12/1969 | Frazier | 156/415 X |
| 3,536,566 | 10/1970 | Frazier et al. | 156/415 |
| 3,560,302 | 2/1971 | Missioux | 156/415 |
| 2,123,586 | 7/1938 | Heston | 156/418 |
| 1,902,306 | 3/1933 | Kraft | 156/418 |
| 3,433,695 | 3/1969 | Caretta et al. | 156/415 X |
| 3,467,567 | 9/1969 | Woodhall | 156/415 |
| 3,503,829 | 3/1970 | Menell et al. | 156/416 X |
| 3,560,301 | 2/1971 | Cantarutti | 156/415 X |
| 3,684,621 | 8/1972 | Frazier et al. | 156/415 |
| 3,078,204 | 2/1963 | Appleby | 156/401 X |

*Primary Examiner*—Alfred L. Leavitt
*Assistant Examiner*—C. B. Cosby
*Attorney*—Watts, Hoffmann, Fisher & Heinke

[57] ABSTRACT

Tire building method and apparatus especially adapted for single stage building of "belted" pneumatic tires, using a drum assembly providing a rigid cylindrical surface for the building thereon of a flat, cylindrical tire body or carcass by the application to the drum of one or more radial or bias cord inner body or carcass plies and which drum is expansible for assembly and setting with the inner body or carcass of the inextensible tire beads or bead rings, and is further expansible and otherwise movable to impart to the body or carcass the desired size and shape for the reception of the circumferentially inextensible breaker strip or strips which form the "belt" and the tire tread material. The drum assembly includes three axially adjacent, mechanically expansible, sections the center section being expansible to a substantially greater extent than the end sections and the end sections being movable axially toward one another when the center section is expanded beyond the end sections to maintain the transverse perimetric dimension of the drum assembly constant or substantially so. The center drum section includes replaceable or interchangeable interleaved peripheral segments that are moved in a positive manner transversely of the drum axis to form a rigid expansible surface. A flexible cover, expansible peripherally, overlies the center drum section and is secured to the end drum sections. Pivotable members, circumferentially adjacent each other and carried by the end drum sections, underly the periphery of the flexible peripherally expansible cover on opposite sides of the center drum section and provide rigidity the full length of the drum assembly.

13 Claims, 15 Drawing Figures

INVENTOR.
WILHELM BREY
BY Watts, Hoffmann,
Fisher & Heinke
ATTORNEYS

Patented Oct. 16, 1973

INVENTOR.
WILHELM BREY

BY Watts, Hoffmann,
Fisher & Heinke
ATTORNEYS

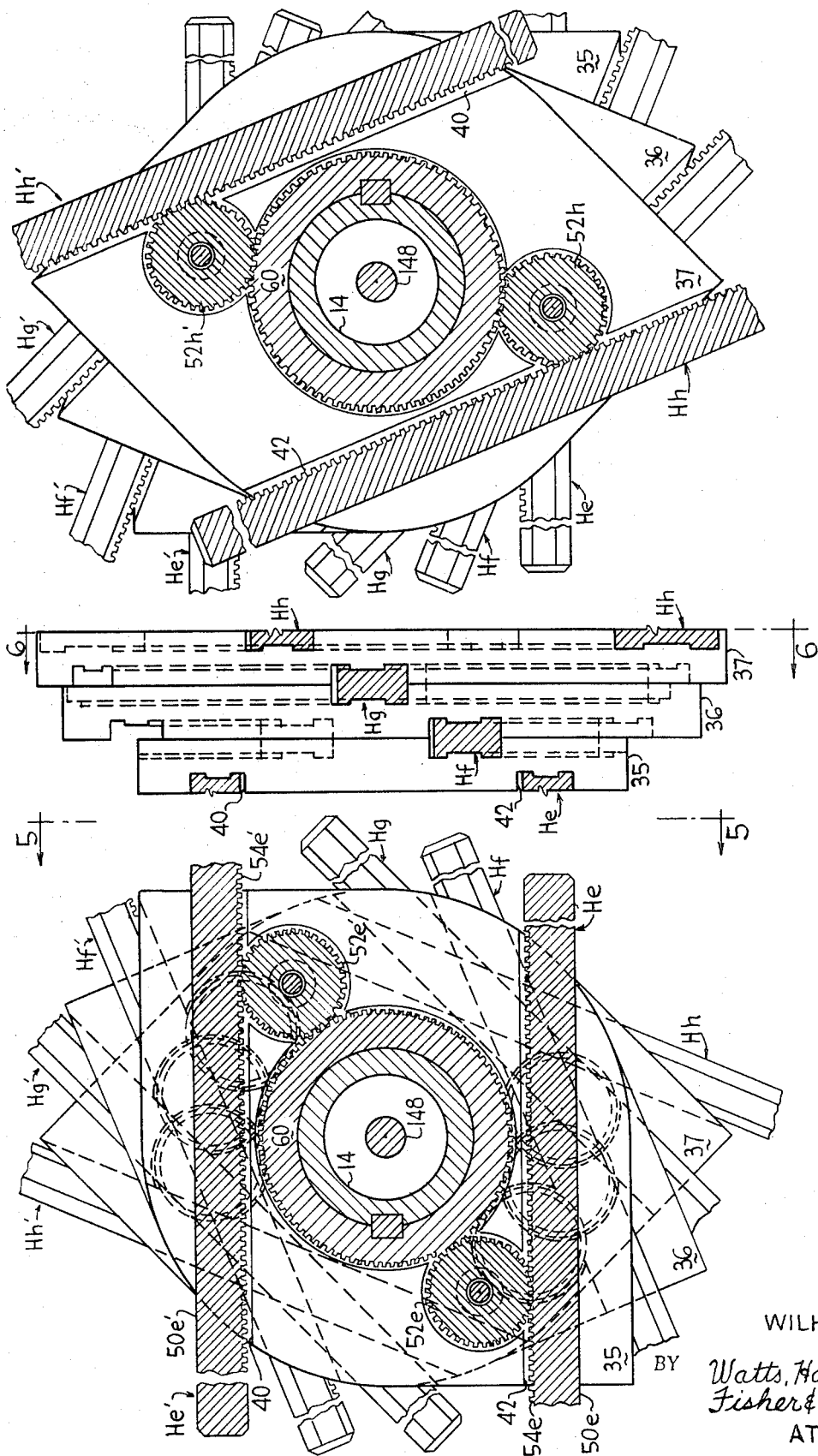

Patented Oct. 16, 1973

INVENTOR.
WILHELM BREY

BY Watts, Hoffmann,
Fisher & Heinke
ATTORNEYS

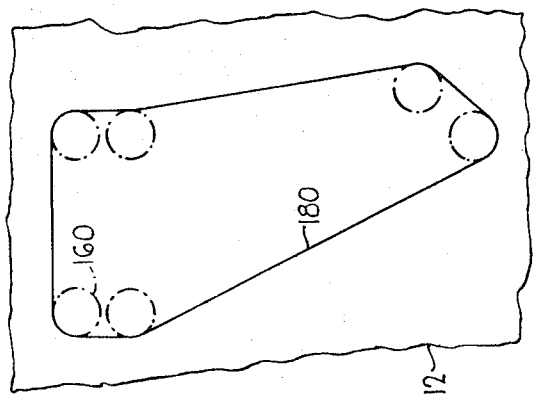
FIG. 11.
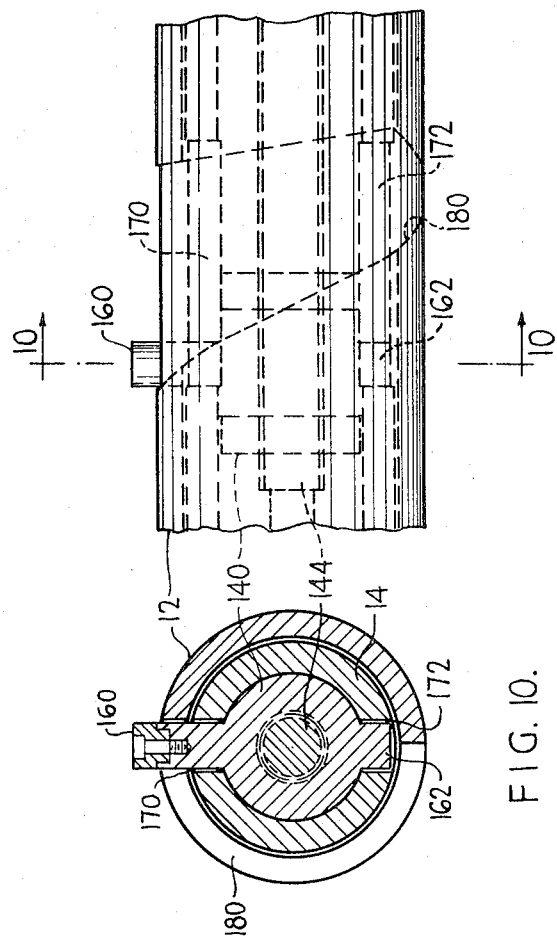
FIG. 9.
FIG. 10.
INVENTOR.
WILHELM BREY

INVENTOR.
WILHELM BREY

TIRE BUILDING APPARATUS

FIELD OF INVENTION

The invention relates to the building of belted pneumatic tires.

PRIOR ART

Tire building apparatus for use in building belted pneumatic tires is known but such apparatus is complicated in design, expensive to manufacture and maintain, unreliable in operation and not adaptable or readily adaptable to the building of tires of different size.

SUMMARY OF INVENTION

The invention provides a novel and improved apparatus relatively simple in design, inexpensive to manufacture, and positive and reliable in operation and method for single stage building of pneumatic radial tires and belted tires by the use of an expansible drum assembly which provides a continuous or substantially continuous rigid surface for the assembly of the carcass plies, belt ply or plies and tread material. The invention further provides such apparatus usable for the building of tires of different wheel diameters and various sizes for a given wheel diameter by replacing a limited number of detachable parts.

The invention will be better understood and further advantages, as well as objections thereof, will become apparent from the accompanying drawings and ensuing description of the preferred embodiment of the invention.

BRIEF DESCRIPTION OF THE DRAWINGS

FIG. 4 is a fragmentary sectional view approximately on the line 4—4 of FIG. 2;

FIG. 5 is a fragmentary elevational view approximately on the line 5—5 of FIG. 4;

FIG. 6 is a fragmentary sectional view approximately on the line 6—6 of FIG. 5;

FIG. 9 is a fragmentary elevational view of a portion of FIG. 2;

FIG. 10 is a sectional view approximately on the line 10—10 of FIG. 9;

FIG. 11 is a developed view of an aperture shown in FIGS. 9 and 10;

DESCRIPTION OF PREFERRED EMBODIMENT

Figure 1:
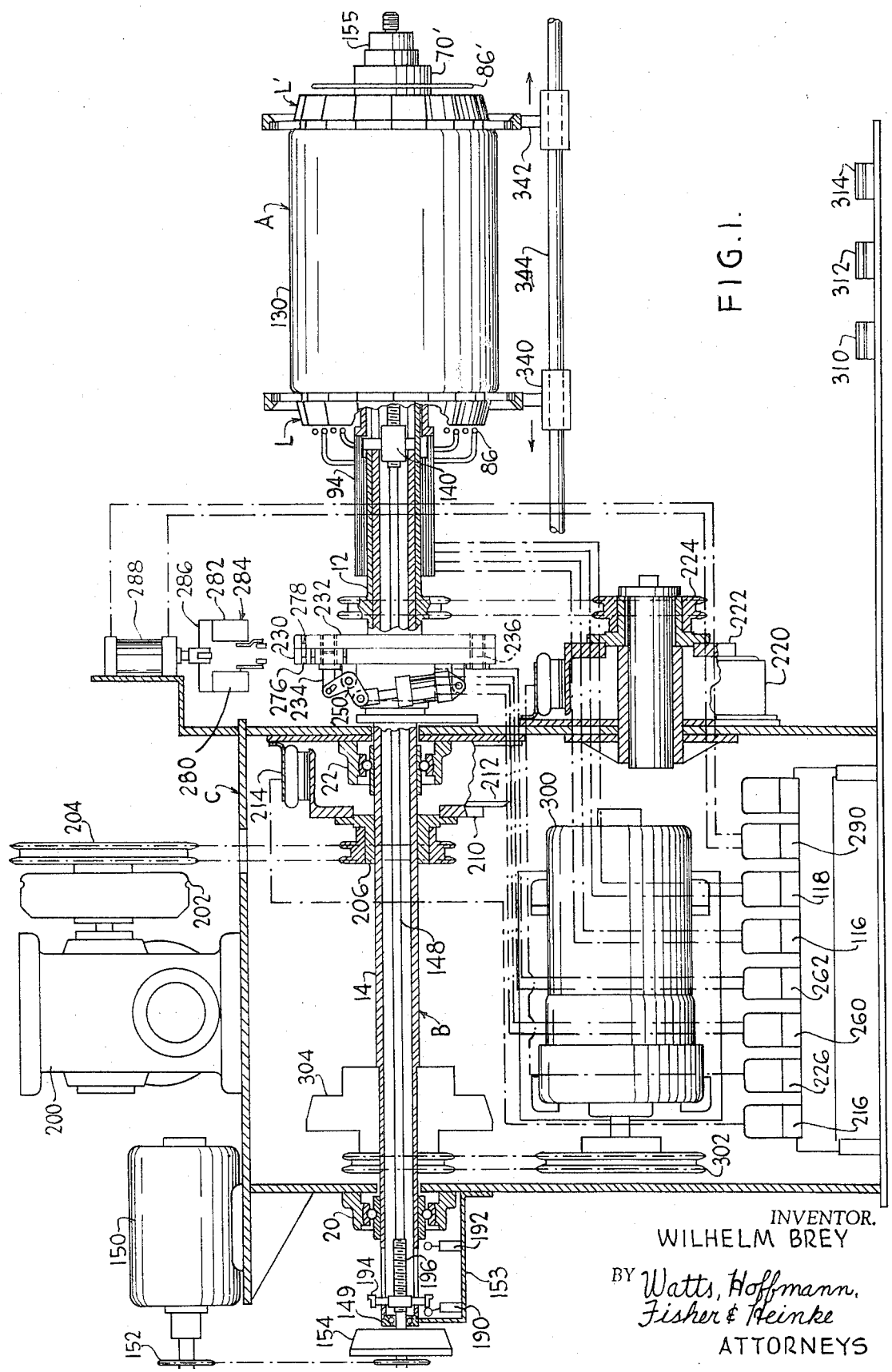
FIG. 1 is a front elevational view, partly schematic, with parts broken away and in section of a tire building machine embodying the preferred apparatus of the present invention.

The preferred apparatus illustrated in the drawings comprises a tire building expansible drum assembly or drum A, upon which the body or carcass plies, either radial or bias cord, are wrapped, the bead rings assembled therewith, and the belt ply or plies, tread material, etc., applied. The drum assembly A is carried by a power shaft assembly B, rotatably supported in a housing or frame C which supports and/or encloses mechanism for manipulating the drum A and further auxiliary mechanism necessary for the building of the tire, such as, the bead setting units at opposite ends of the drum A and required pressing or stitching units for firmly pressing the plies, etc., together free of distortion and wrinkles.

Figure 2:
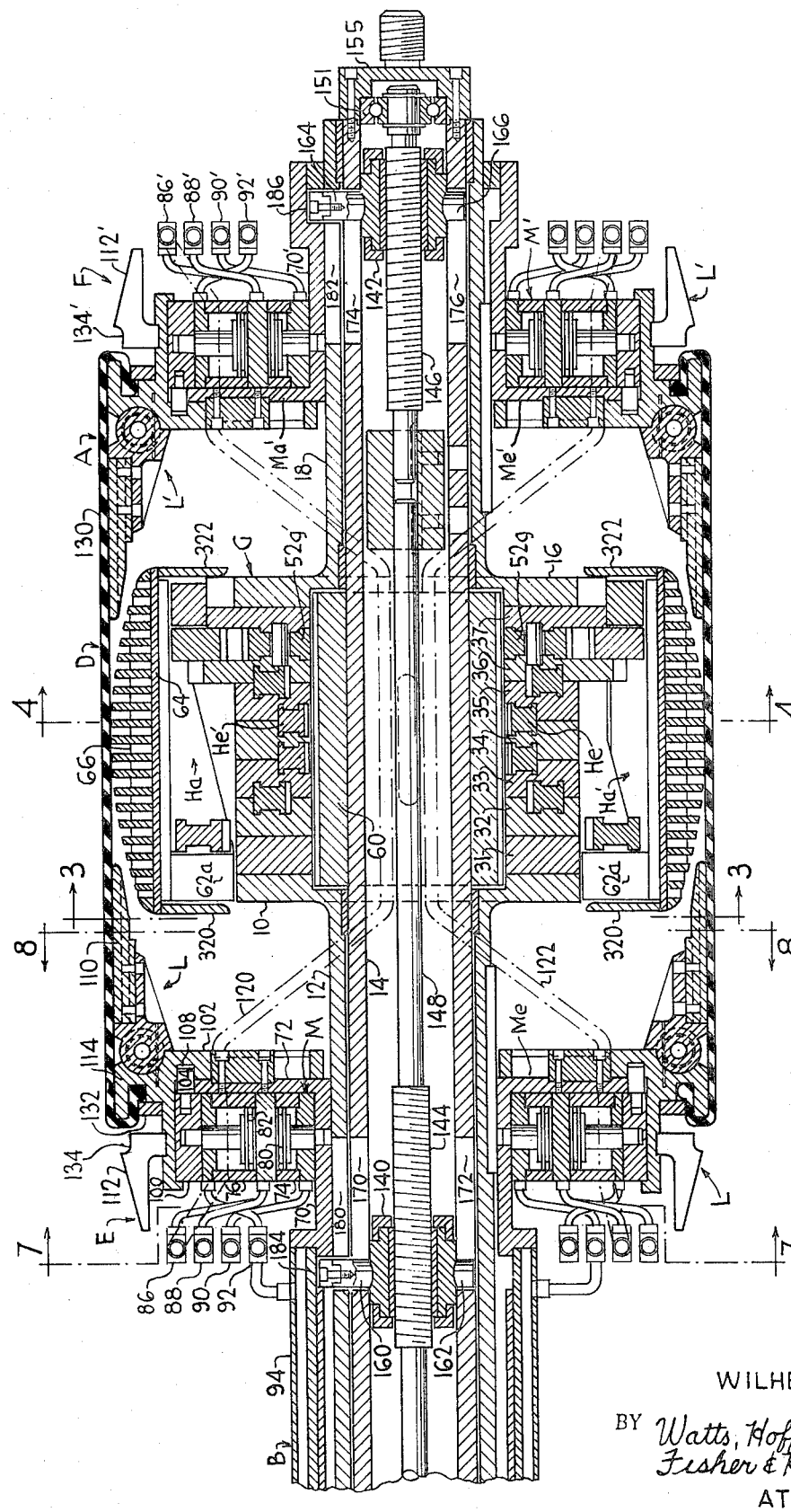
FIG. 2 is a vertical sectional view through the vertical center line of the drum assembly of the apparatus shown in FIG. 1, approximately on the line 2—2 of FIGS. 2 and 7, with portions in elevation and in section on the line 2B—2B of FIG. 8.
Figure 3:
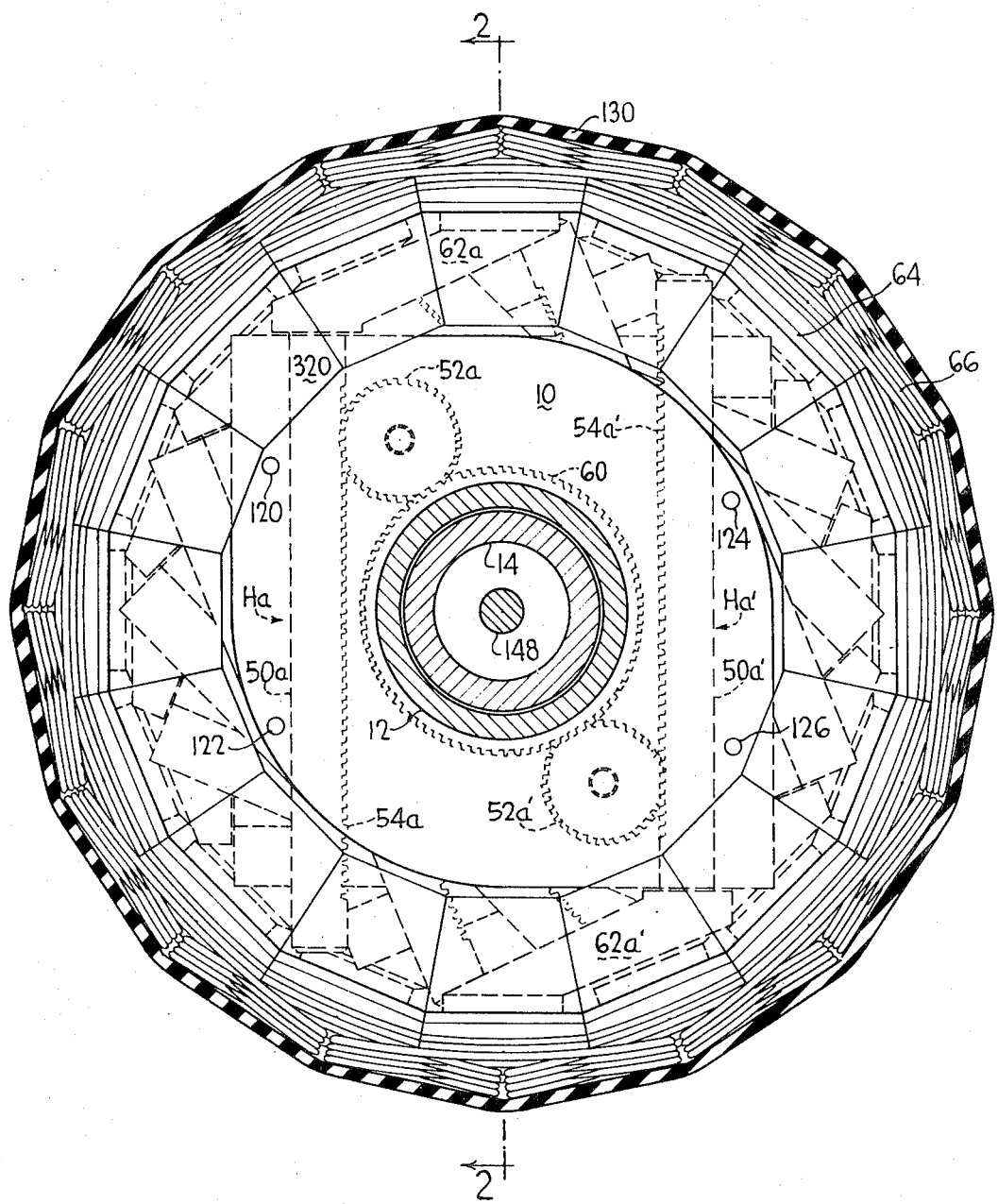
FIG. 3 is a fragmentary sectional view approximately on the line 3—3 of FIG. 2.
Figure 7:
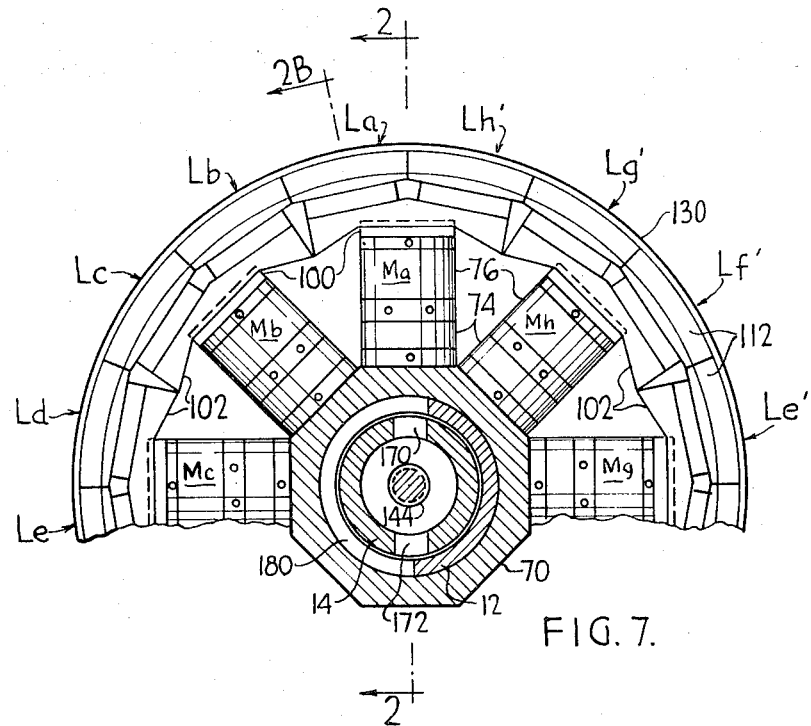
FIG. 7 is a fragmentary sectional view approximately on the line 7—7 of FIG. 2.
Figure 8:
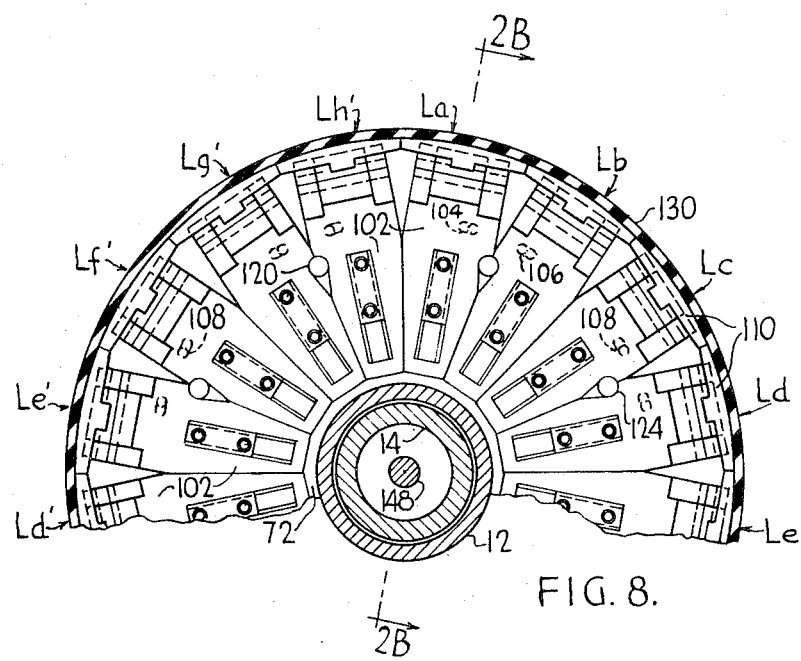
FIG. 8 is a fragmentary sectional view approximately on the line 8—8 of FIG. 2.
Figure 14:
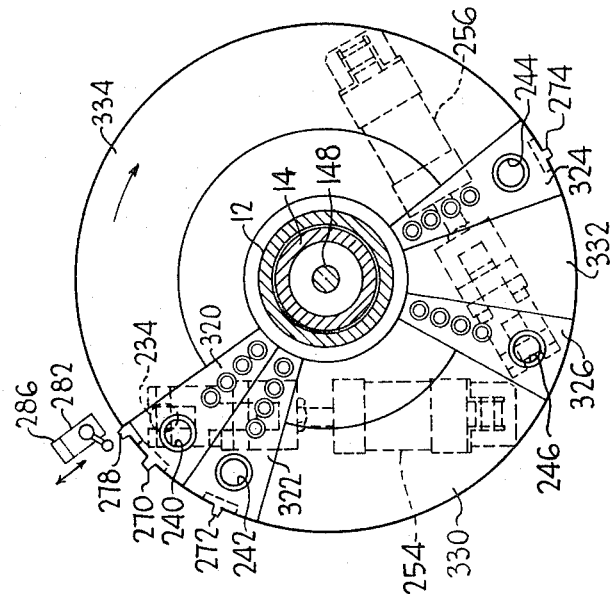
FIG. 14 is a view approximately on the line 14—14 of FIG. 12.
Figure 12:
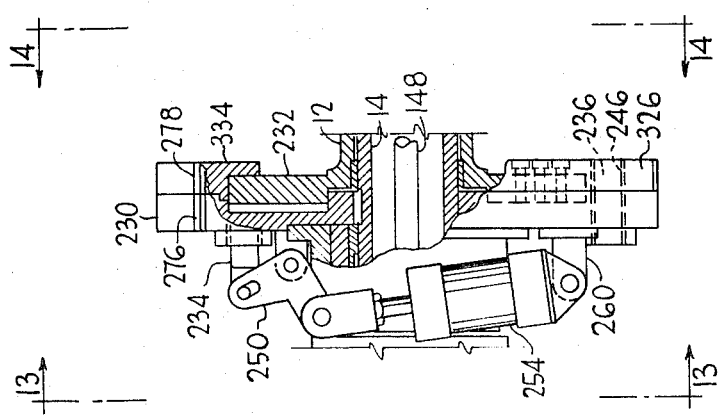
FIG. 12 is a fragmentary elevational view of a portion of FIG. 1 with parts in section.
Figure 13:
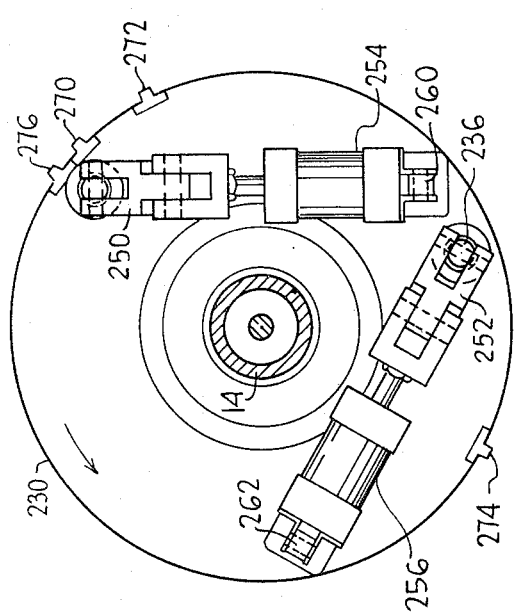
FIG. 13 is a view approximately on the line 13—13 of FIG. 12.

The drum assembly A comprises three axially oriented, expansible sections, an intermediate or center section D, and left and right-hand end or side sections E and F, as viewed in FIGS. 1 and 2. The center section D comprises a gear box assembly G, the left-hand side of which is a flange 10 on the adjacent end of a tubular shaft 12 of the power shaft assembly B, projecting from the frame C. The shaft 12 is made in two detachable parts to facilitate manufacture etc., and is rotatably supported on a tubular shaft 14 also forming a part of the power shaft assembly B by sleeve bearings at opposite ends of the two parts thereof.

The shaft 14 is rotatably supported in the frame or housing C by antifriction bearings 20, 22. The side of the gear box assembly G opposite the flange 10 is a flange 16 on the adjacent end of a tubular shaft 18 rotatably supported on the tubular shaft 14 by sleeve bearings at opposite ends similar to the bearings which support the shaft 12.

The gear box assembly G comprises, in the embodiment illustrated, seven plate-like members 31 to 37 bolted to one another and to the left and right-hand end plates or flanges 10, 16 on the shafts 12, 18, respectively. The adjoining faces of the flanges 10 and 16 and the members 31 to 37 are each provided with a pair of facing grooves 40, 42 within which are supported essentially similar radially movable assemblies H$a$ to H$e'$ and H$a'$ to H$h'$.

Assemblies H$a$, H$a'$ are supported in the grooves 40, 42 in adjoining faces of the flange 10 and the member 31 are offset from the center of the assembly G and are extensible and retractable relative thereto in opposite directions. The second pair of assemblies H$b$, H$b'$ are supported and movable in a similar manner between adjoining faces of members 31, 32 but their paths of movement are 22½° in a counterclockwise direction, as viewed in FIG. 6. The third, fourth, etc., assemblies H$c$, H$c'$ and H$d$, H$d'$, etc., are similarly supported and moved between members 32, 33 and 33, 34, etc., respectively. Each assembly H$a$ to H$h$ and H$a'$ to H$h'$ includes a bar-like member 50$a$ to 50$h$ and 50$a'$ to 50$h'$, respectively, radially movable in the assembly G by gears 52$a$ to 52$h$ and 52$a'$ to 52$h'$ in mesh with rack teeth 54$a$ to 54$h$ and 54$a'$ to 54 $h'$ on the bar-like members 50$a$ to 50$h$ and 50$a'$ to 50$h'$, respectively, and with an elongated gear 60 keyed to the shaft 14. There are two assemblies H, as previously mentioned, between each adjoining flange 10 and 16 and members 31 to 37 slidable in parallel paths offset from and located at opposite sides of the axis of the drum A. The members 31 to 37 are duplicates of one another except that successive members are rotated 22½°. The sides of the flanges 10 and 16 facing members 31, 37 are in effect half members, similar to the members 31 to 37 as they and the members 31, 37 adjacent thereto each support two assemblies H.

Each of the movable assemblies Ha to Hh and Ha' to Hh' include axially extending members 62a to 62h and 62a' to 62h' connected to the extensible end of the bar member 50a to to 50h and 50a' to 50h', respectively, to which circumferentially extending members 64 are detachably connected. Each of the members 64 carry a plurality of radially extending spaced members 66 which are offset from and interleaved with the same members of the adjacent assembly H, when the central section D of the drum is in its retracted or partially expanded condition. When the drum is in its expanded condition the adjoining ends of the members 66 adjacent to one another and at all time provide an essentially continuous cylindrical center section surface. The essential difference between the respective assemblies Ha to Hh and Ha' to Hh' is the fact that the connection of the members 62a to 62h and 62a' to 62h' with the plate or member 64 which supports the members 66 moves progressively from one end to the central section D of the drum toward the other since the rod-like members 50 a to 50h and 50a' to 50h' move progressively from one end of the central section D of the drum toward the other.

The central drum section D of the drum A is expanded and contracted by rotating the gear 60 through the shaft 14 while the remainder of the section is held against rotation through the shaft 12.

The left and right side sections E and F of the drum A are mirror images of one another and only the left section E will be described. Corresponding parts of the right section F will be designated by the same reference characters with a prime mark affixed thereto.

The left-hand side section E of the drum A comprises a tubular member 70 slidably keyed on the shaft 12 to the left of the center drum section D. The tubular member 70 is provided with a radial flange 72 upon which is slidably supported a plurality, in the present instance 16 of radially movable assemblies La to Lh to adapted to be moved in opposite directions radially of the axis of rotation of the drum A by light 8 compound double-acting reciprocating-type fluid operated motor assemblies Ma to Mh. Each motor assembly M moves two adjacent assemblies L and comprises inner and outer motors comprising cylinders 74, 76, respectively, fixed to one another within which pistons 80, 82, respectively, are located. Fluid pressure, preferably air, is admitted to opposite ends of the cylinders of the motor assemblies M by suitable headers designated generally 86, 88, 90, 92 supported on the member 70 by rigid conduits connected to a fluid supply unit 94 concentric with the shaft 12. The conduits from the headers to the motors M are flexible.

The piston rods which carry the pistons 80 are fixedly secured to the member 70 and as fluid pressure is admitted to the radially outer end of the cylinder 74 the cylinder is moved radially outwardly carrying with it the cylinder 76 and the piston 82, etc. When fluid pressure is admitted to the radially inner end of the cylinder 76, piston 82 and the piston rod connected thereto moves radially outwardly carrying with it a member 100 which member is in turn connected to the parts 102 of two adjacent assemblies L by pins 104, 106 movable radially in circumferential slots in the flange 72 and arcuately in grooves 108 in the members 102 of the assemblies L. The assemblies L are moved radially inwardly by reversing the flow of fluid pressure to and from the cylinders 74, 76 of the motor assemblies M. Each of the assemblies L include a member 110 pivotally connected to the member 102 thereof and extending toward the central section D of the drum A and a second member 112, spaced from an upstanding part 114 of the member 102. The motor assemblies M all operate in unison and fluid pressure for operating them is supplied thereto and exhausted therefrom through suitable solenoid operated three-way valves 116, 118 and the distributor unit 94, previously referred to.

Fluid pressure is supplied to the motor assembly M' forming a part of the right section F by headers 86', 88', 90', 92', corresponding to the headers of the left section E and to which headers fluid is supplied from the left section E by conduits 120, 122, 124, 126 connected between the two sets of headers and extending through the end sections E and F and the center section D. The portions of the conduits 120, 122, 124, 126 extending between the headers 86, 88, 90, 92 and the end section E and between the end section E and the center section D, and between the center section D and the end section F and between the end section F and the headers 86', 88', 90', 92, are flexible. The other portions of the conduits are suitable bores through suitable members of the end and center sections of the drum A.

The center section D of the drum A and the end sections E and F thereof are enclosed in an elastic or espansible sleeve 130, the opposite ends of which are bent inwardly around a portion of the projections 114, 114' of the various assemblies L, L', and secured thereto by members 132, 132' detachably connected to the members 102, 102' of the assemblies L, L', respectively. The members 112, 112' of the end sections have circumferential apertures or cutouts 134, 134' in the portions thereof adjacent to the ends of the elastomer tubular member or sleeve 130 for assisting in bending the body plies of a tire being built about the bead rings.

The end sections E, F, are adapted to be moved toward and from the center section of the drum D by nut assemblies 140, 142 threaded upon threaded portions 144, 146, respectively, of a shaft 148 rotatably supported concentric with the power shaft B by antifriction bearings 149, 151, the first of which is carried in an extension 153 of the frame C, and the second of which is carried by a member 155 connected to the right-hand end of the shaft 14. The shaft 148 is made in two parts, as illustrated in FIG. 2, to facilitate manufacture and assembly, and is adapted to be rotated in opposite directions by a reversible electric motor 150 fixed to the frame C and connected to the shaft 148 by a flexible drive 152 and an electric clutch 154. The nut assemblies 140, 142 have oppositely extending projections 160, 162 and 164, 166 each of which extend through a respective slots 170, 172 and 174, 176 in the shaft 14. The projections 160, 164 of the nut assemblies 140, 142 extend through apertures 180, 182 in the shafts 12 and 18 and their projecting ends extend into suitable circumferentially extending grooves 184–186 in the members 70, 70', respectively.

The construction just referred to is such that as the nut assemblies 140, 142 move along the threaded sections of the shaft 148, either toward or from the center section D, the end sections E, F are carried along therewith. The slots 170, 172 are of a width such that the projections 160, 162 of the nut assemblies 140, 142 slide therein without excessive clearance and the apertures 180, 182 are mirror images of one another and in the embodiment shown extend slightly more than 180° circumferentially in the shafts 12 and 18 and slope or are inclined toward the center section D and gradually decrease in width.

The extent of rotation of the shaft 148 and in turn the movements of the end sections E, F of the drum A is controlled by the limit switches 190, 192 on the frame member 154 and adapted to be tripped or actuated by a trip 194 externally of the shaft 14 and connected by arms extending through slots in the shaft 14 to a threaded section 196 on the left end of the shaft 148. Actuation of the limit switches 190, 192 stops rotation of the motor 150.

The shaft 14 is adapted to be selectively rotated in opposite directions relative to the shaft 12 to expand and contract center drum section D by an electric gear motor 200 through an electric clutch 202 and a sprocket chain drive, designated generally as 204, the driven sprocket of which is keyed to a flanged collar 206 fixed to the shaft 14 and having the drum element 210 of a commercial air-applied brake 212 connected thereto. The stationary part 214 of the brake 212 is fixed to the housing or frame C. The supply of air to the brake 212 is controlled by a solenoid-operated valve 216. The shaft 12 is adapted to be selectively held stationary by an air actuated brake 220 of commercial construction. The movable drum part 222 of the brake 220 is connected to the shaft 12 by a sprocket wheel drive 224 and the stationary part of the brake is fixed to the housing of frame C. The supply of air to the brake 220 is controlled by a solenoid operated valve 226.

The shafts 12, 14 are selectively connected to rotate together or relative to one another by a disk-like member 230 fixed to the shaft 14 and to a flange or disk-like member 232 on the left-hand end of the left-hand part of the shaft 12, respectively. The adjoining ends of the two parts of shaft 12 are permanently connected to rotate as a unit by a square-tooth clutch connection. The sequence or timing disks 230, 232 are selectively connected to one another in different angular positions by pins 234, 236 carried by the disk 230. Pin 234 is adapted to be selectively projected into and withdrawn from suitable apertures 240, 242, 244 in the disk 232 and pin 236 is adapted to be selectively projected into and withdrawn from aperture 246 in the same disk.

The pins 234, 236 extend through disk 230 and the ends thereof opposite disk 232 are connected to one arm of bell crank levers 250, 252, respectively, carried by suitable brackets on the side of the disk 230 opposite the disk 232. The opposite arms of levers 250, 252 are connected to piston rods of reciprocating-type, double-acting air actuators 254, 256, respectively. The cylinders of the actuators 254, 256 are pivotally connected to suitable brackets 260, 262 fixed to the side of the disk 230 opposite the disk 232. Air is supplied to and exhausted from opposite ends of the cylinders of the actuators 254, 256 under the control of solenoid operated three-way valves 260, 262, respectively.

The amount of relative rotation between the disks 230, 232 controls the amount of expansion or contraction of the center section D of the drum A and is controlled by stops or trips 270, 272, 274, 276 on disk 230 and a similar trip 278 on disk 232. The trips 270, 272, 274, 276 on disk 232 actuate a limit switch 280 and trip 278 on the disk 232 actuate a limit switch 282 of a limit switch assembly 284 including a member 286 slidably supported on the frame C and upon which the switches 280, 282 are mounted. The limit switch assembly 284 is adapted to be reciprocated by a double-acting fluid pressure operated reciprocating type actuator 288 connected to the member 286 and to the frame C into and out of an operating position in which the switches are in the path of the trips 270, 272, 274, 276, 278. Air is supplied to and exhausted from opposite ends of the actuators 288 under control of a solenoid-operated three-way air valve 290.

The shafts 12 and 14 are adapted to be rotated in unison with the pin 236 connecting the disks 230, 232 and in turn the drum A is adapted to be rotated for the application of different tire material thereto by an electric motor 300 located within the frame of the apparatus C and connected to the left end of the shaft 14 by a sprocket chain drive 302 and an electric clutch 304. In addition to the control elements of the apparatus heretofore referred to, such as, the limit switches 190, 192, 280, 282, the solenoid-operated valves 116, 118, etc., the control system which is not shown in detail comprises forward, reverse and stop pedal switches 310, 312, 314, and necessary push button switches.

As previously mentioned, the apparatus is readily convertible for the building of various size tires. For this purpose the members 64 are removable and can be readily replaced by members of different size. The apertures 240, 242, 244, 246 carried by the disk 232 for reception of the pins 234, 236 are formed in segmental members 320, 322, 324, 326, respectively, detachably connected to and adjustable axially of the disk proper. Spacer members 330, 332, 334 are employed between the segmental members 322 and 326, 326 and 324, 324 and 320 to provide a smooth surface adjacent to the periphery of the disk. The segmental members 320, 322 in the embodiment shown abut one another.

Other necessary parts of the apparatus are also readily adjustable, for example, the location of the limit switches 190, 192 on the frame member 154 for the purpose of controlling the extent of movement of the end sections E and F of the drum A toward and from the center section D.

The various operating parts of the apparatus are largely shown in the drawings in the positions which they occupy when the drum is in its smallest contracted condition, that is, in the condition existing for removal of a completed tire. Clutches 202, 304 are open; limit switch assembly 284 is in its retracted position; pin 234 is in its retracted position; pin 236 is projected into aperture 246 in disk 232; and motor 150, clutch 154 and brakes 212, 220 are de-energized.

Preparatory to building a succeeding tire the operator depresses electric push-button start switch, not shown, establishing electric circuits causing three-way solenoid valve 290 to move limit switch assembly 284 to its forward or operating position in which the wheeled operating levers of the limit switches 280, 282 are in position to be engaged by the trips or stops on disk 230, 232; electric clutch 202 to engage; motor 200 to operate rotating the power shaft B until trip 278 on disk 232 actuates limit switch 282 establishing electric circuits which stop motor 200 and in turn timing disk 232 in a predetermined angular position; cause three-way solenoid valve 226 to energize or apply air brake 220 holding outer shaft 12 stationary; and a time-delay circuit to be established.

After a predetermined short interval the time delay circuit establishes electric circuits causing: three-way solenoid valves 260, 116 to withdraw pin 236 and hole 246 in disk 232 and connect opposite ends of the radially inner end of cylinders 74 of the motor assemblies M to the air supply and exhaust to expand end sections E and F of the drum to their initial building diameter; and motor 220 to operate rotating inner shaft 14 and disk 230 relative to outer shaft 12 and disk 232 in small amounts, for example, about 5° in the preferred embodiment shown, at a slow speed, for example, approximately 6 rpm, expanding the center section D of the drum A to its initial building diameter. After a predetermined rotation of the shaft 14 and disk 230 relative to shaft 12 and disk 232, switch 280 is tripped by a first trip or stop 270 on disk 230 establishing electric circuits: de-energizing clutch 202; stopping motor 200; and causing three-way solenoid valves 226, 262, 290 to de-energize or release brake 220, insert pin 234 into aperture 240 in disk 232 and retract limit switch assembly 284 to its inoperative position, respectively.

During the slight rotation of the shaft 14 just referred to, the nut assemblies 140, 142 were rotated slightly because of the projection of the bosses thereof through the slots in the shaft 14 but because the shaft 148 was free to rotate since the clutch 154 was disengaged the shaft 154 turned with them and no movment of the end sections E, F towards the center section D of the drum A took place. Alternatively, the slots 170, 172, 174, 176, in the shaft 14, could have circumferential dimensions permitting rotation of the shaft 14 without rotating the nut assemblies 140, 142. The circumferential extent of the apertures 180, 182 in the shafts 12 and 18 allowed the bosses or projections 160, 164 of the nut assemblies to move circumferentially therein.

The drum A is now in its initial building diameter and is ready for the application of the inner body or carcass plies. For this purpose the operator may cuase the drum to rotate in the forward direction by depressing forward rotation pedal switch 310, energizing the main drive motor 300 and clutch 304. The operator may cause the drum A to rotate in the reverse direction by depressing reverse pedal switch 312. The drum A may be held in any position in which it stops by the operator depressing stop pedal switch 314. This stops motor 300, de-energizes clutch 304 and causes valve 216 to apply brake 212, holding the drum in the stopped position. When the pedal switch 314 is released the brake 212 is released.

After the inner body plies have been applied to the drum and properly stitched together, the inner body is ready for expansion into its second or bead setting diameter. The bead rings carried by suitable handling equipment illustrated diagrammatically as members 340, 342, slidable along a bar 344 fixed to the frame C, are moved by the operator or automatically into position surrounding the inner body plies adjacent to their ends. Thereafter the operator depresses a second electric push-button switch. This establishes electric circuits causing: clutch 202 to engage; three-way solenoid valve 290 to move limit switch assembly 284 to its forward or operating position and motor 200 to operate rotating the power shaft B until trip 278 on segment 334 of disk 232 actuates limit switch 282 establishing electric circuits which stop motor 200 and in turn timing disk 232 in the previously mentioned predetermined angular position; cause three-way solenoid valve 226 to apply brake 220 holding outer shaft 12 stationary and a time-delay circuit to be established which timing circuit after a predetermined short time establishes electric circuits causing: three-way solenoid valves 226, 118 to withdraw pin 234 from aperture 240 in disk 232 and connect opposite end of the radially outer cylinders 76 of the motor assemblies M to the air supply and exhaust to expand end sections E and F of drum A to their second or bead setting diameter, respectively; and motor 200 to operate rotating inner shaft 14 and disk 230 relative to outer shaft 12 and disk 232 a second small amount, about 19° in the preferred embodiment shown at a slow speed, such as 6 rpm, expanding the center section D of the drum A to its third diameter. After a predetermined rotation of the shaft 14 and disk 230 relative to shaft 12 and disk 232, switch 280 is tripped by a second trip or stop 272 on disk 230 establishing electric circuits; de-energizing clutch 202; stopping motor 200; and causing valves 226, 262, 290 to de-energize brake 220, insert pin 234 into aperture 242 in disk 232, and retract limit switch assembly 284 to its inoperative position, respectively.

During the second slight rotation of the shaft 14 the nut assemblies 140, 142 and the shaft 148 merely rotate with the shaft 14 without producing any movement of the nut assemblies relative to the shaft 148 and movement of the end sections E, F of the drum A towards or from the center section D. As previously mentioned the slots in the shaft 14 may have a circumferential dimension which allows rotation of the nuts therein without producing movement of the end sections E, F relative to the center section of the drum A and the dimensions of the apertures 180, 182 are such as to allow free rotation of the nuts therein.

The drum D is now in its third diameter and the beads have been applied. The ends of the inner body plies are stitched around the bead rings in the usual manner. For this purpose the operator may rotate the drum A either forwardly or reversely or stop and hold it in a given position by depressing the proper pedal switch 310, 312, 314.

After the bead rings have been set and the inner body plies stitched thereover, the center section D of the drum A is further expanded and the end section E and F move inwardly toward the center section D in predetermined timed relation to bring the inner body of the tire into shape for reception of one or more inexpansible, circumferential breaker strips or belts and the tire thread material. Expansion of the center section D and the inward movement of the end sections E, F are initiated by the operator depressing a third push button switch establishing electric circuits causing: three-way solenoid valve 290 to advance limit switch assembly 284 to its forward or operating posiiton; clutch 202 to engage motor 200 to operate rotating the power shaft B until trip 278 on disk 232 actuates limit switch 282 establishing electric circuits which stops motor 200 and in turn timing disk 232 in the previously mentioned predetermined angular position; cause valve 226 to apply brake 220 holding outer shaft 12 stationary; and a time-delay circuit to be established. After a predetermined short time the time-delay circuit establishes electric circuits causing: valve 260 to withdraw the pin 234 from aperture in 242 in disk 232; motor 200 to operate rotating inner shaft 14 and index disk 230 relative to outer shaft 12 and disk 232 at a slow speed, for example, approxiamtely 6 rpm, further expanding the center drum section D; the motor 150 and clutch 154 to be energized rotating screw shaft 148 at a gradually increasing speed, for example, from approximately 88 rpm to 2,200 rpm. Rotation of shaft 14 continues until limit switch 280 is tripped by the third stop or trip 274 on disk 232 and rotation of shaft 148 continues until trip 194 on the sahft actuated switch 192 to stop motor 150 and de-energize clutch 154.

Actuation of the limit switch 280 establishes electric circuits causing: motor 200 and clutch 202 to be de-energized; and valves 226, 262, 290 to de-energize brake 220, project pin 234 into aperture 244 in disk 232 and retract limit switch assembly 284 into its inoperative position, respectively. Upon actuation of the limit switch 280 by the third stop 274 on the timing disk 230, as previously mentioned, the center section D of the drum A has moved to its maximum expanded position. Rotation of the screw shaft 148 moved the nut assemblies 140, 142 and in turn the end sections E, F of the drum A toward the center section D in timed relation to the expansion of the center section D.

Figure 15:
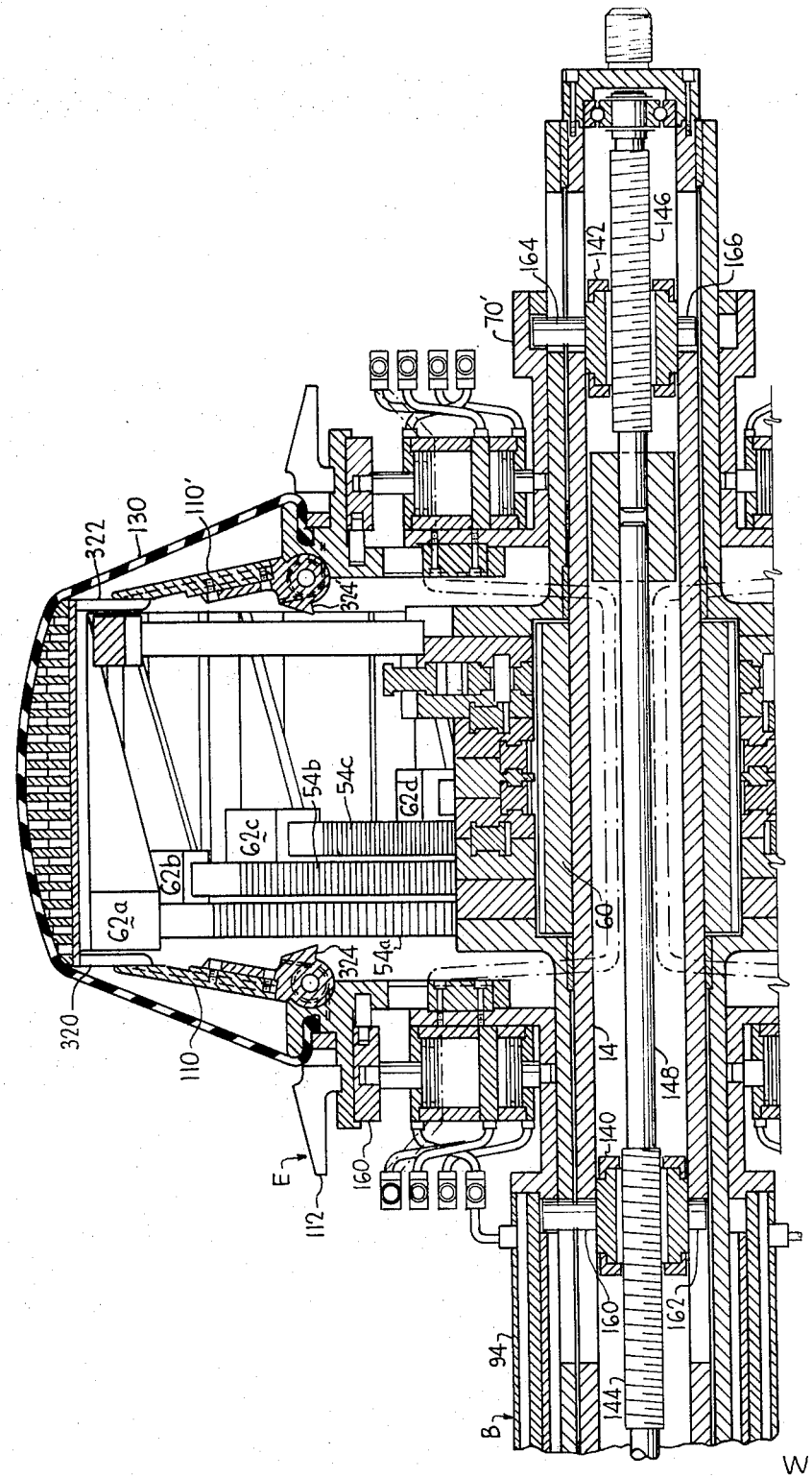
FIG. 15 is a view similar to FIG. 2 but showing the parts in an expanded condition.

During the third expansion of the center section D and the movement of the end sections E and F of the drum A toward the center section D, the inwardly projecting members 110, 110' on the assemblies L and L' engage end portions of the center section D and eventually radially inwardly extending portions 320, 322 at opposite ends of the assemblies H*a* to H*h* to H*a'* to H*h'*, see FIG. 15. The drum A and the inner tire body thereon is now ready for the application of the inexpansible circumferential belt or belt plies and the tire tread material. During this operation the operator may rotate the drum in the forward or reverse direction or stop and hold it in a desired position by depressing the proper pedal switches 310, 312, 314.

Subsequent to the application of the belt or belts and the tire tread material the operator depresses a fourth electric push button switch establishing electric circuits causing: valve 290 to advance limit switch assembly 284 to its forward or operating position; clutch 202 to engage motor 200 to operate rotating the power shaft B until trip 278 on disk 232 actuates limit switch 282 establishing electric circuits which stops motor 200 and in turn timing disk 232 in the previously mentioned predetermined angular position; cause valves 226 to apply brake 220 holding outer shaft 12 stationary and a time-delay circuit to be established which after a predetermined short time interval establishes electric circuits causing: valves 262, 116, 118 to withdraw pin 234 from aperture 244 in disk 232 and connect opposite ends of cylinders 74, 76 of the motor assemblies M to the air supply and exhaust to retract end sections E, F to their original diameter; motor 200 to operate in its reverse direction rotatng inner shaft 14 and disk 230 in a reverse direction relative to outer shaft 12 and disk 232 at a slow speed, for example, approximately 6 rpm, retracting the center section D; and energize motor 150 and clutch 154 to rotate shaft 148 in reverse direction to move end sections E, F away from the center section D of the drum A and into their initial position. Motors 150, 200 are rotated in timed relation with the speed of motor 150 gradually decreasing rotation of motor 200 and continues until limit switch 280 is tripped by the fourth stop or trip 276 on disk 230 and motor 150 continues to rotate until the trip 194 on screw shaft 148 actuates limit switch 190. Actuation of limit switch 190 stops motor 150 and de-energizes clutch 154. Actuation of limit switch 280 establishes electric circuits: de-energizing clutch 222; stopping motor 400; and causing valves 226, 262, 290 to de-energize brake 220, insert pin 236 into aperture 246 in disk 232 and retract limit switch assembly 284 to its inoperative position, respectively. At this time the drum A is in its minimum diameter and the tire can be removed. During the aforementioned reverse rotation of disk 230, limit switch 280 was rendered ineffective by a counting relay when actuated by the stop or trips 272, 274, 276 and the members 110, 110' of the assemblies L, L' are returned to their original positions with abutments 324, 324' thereon in engagement with members 102, 102'.

While the preferred embodiment of the invention has been described in considerable detail, it is to be understood that it is only illustrative of the invention which can be otherwise incorporated. The circumferential or peripheral members, for example, of the center section of the drum may be moved transversely of the axis of rotation of the drum by means other than the gears and racks employed in the preferred embodiment, such as by double acting, fluid-actuated, reciprocating-type motors having the circumferential members connected to their piston rods, etc.

It is the intention to hereby cover all modifications of the preferred embodiment which come within the practice of those skilled in the art to which the invention relates.

Having thus described my invention, what I claim is:

1. In apparatus for use in building pneumatic tires including radial and/or belted tires; a selectably rotatable first member; a tire building drum including first, second and third expansible and contractable drum sections axially arranged on said first member with said second section intermediate said first and third sections; an expansible and contractable member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said expansible and contractable member adjacent an end thereof, first means connecting said third members to said second member for movement in linear paths transversely of the axis of rotation of said first member, and first power actuated means for moving said third members in said linear paths transversely of the axis of rotation of said first member; second power actuated means for moving said second members longitudinally of the axis of rotation of said first member; said second drum section comprising: a plurality of circumferentially oriented fourth members having arcuate external surfaces disposed concentrically of the axis of rotation of said first member forming a cylindrical continuous or a substantially cylindrical and continuous surface engaging the interior of said expansible and contractable member adjacent the central part thereof, fifth members slidably supported by said first member and having rack teeth thereon connecting said fourth members to said first member for movement in linear paths transversely of the axis of rotation of said first member, and power actuated gear means in mesh with said rack teeth of said fifth members for moving said fourth members transversely of the axis of rotation of said first member; control means for actuating said first power actuated means and said power actuated gear means to move simultaneously said third and fifth members in stages or steps of predetermined amount in their respective said linear paths transversely of the axis of rotation of said first member to expand or contract said expansible and contractable member; and control means for actuating said second power actuated means and said gear means to move simultaneously and in predetermined relation to one another said second members of said first and third drum sections and said third members connected thereto towards said second drum section and said fifth members in their respective said linear paths transversely of the axis of rotation of said first member to expand or contract the part of said expansible and contractable member between its ends.

2. In apparatus for use in building pneumatic tires including radial and/or belted tires : a selectable rotatable first member; a tire building drum including first, second and third expansible and contractable drum sections axially arranged on said first member with said second section intermediate said first and third sections; an expansible and contractable member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said expansible and contractable member adjacent an end thereof, means connecting said third members to said second member for movement in linear paths transversely of the axis of rotation of said first member; second power actuated means for moving said second members longitudinally of the axis of rotation of said first member; said second drum section comprising: a plurality of circumferentially oriented fourth members having rack teeth thereon slidably supported by said first member for movement in linear paths transversely of the axis of rotation of said first member, a plurality of circumferentially oriented assemblies connected to said fourth members, each of said assemblies comprising a plurality of axially spaced circumferentially extending plate-like fifth members having their opposite ends interposed between adjacent ends of said plate-like fifth members of adjoining assemblies and arcuate external surfaces disposed circumferentially of the axis of rotation of said first member to form a cylindrical continuous or substantially cylindrical and continuous surface engaging the interior of said expansible and contractable member adjacent the center part thereof, and power actuated gear means in mesh with said rack teeth of said fourth members for moving said fourth members and said assemblies connected thereto in said linear paths transversely of the axis of rotation of said first member; control means for actuating said first power actuated means and said power actuated gear means to move simultaneously said third members and said assemblies in stages or steps of predetermined amounts in their respective said transverse paths transversely of the axis of rotation of said first member to expand or contract said expansible and contractable member; and control means for actuating said second power actuated means and said power actuated gear means to move simultaneously and to predetermined relation to one another said second members of said first and third drum sections and said third members connected thereto towards said second drum section and said fourth members and said assemblies connected thereto transversely of the axis of rotation of said first member to expand or contract the part of said expansible and contractable member between its ends.

3. In apparatus: for use in building pneumatic tires including radial and/or belted tires: a selectably rotatable first member; a tire building drum including first, second and third expansible and contractable drum sections axially arranged on said first member with said second section intermediate said first and third sections; an expansible and contractable member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said expansible and contractable member adjacent and end thereof, first means connecting said third members to said second member for movement in linear paths transversely of the axis of rotation of said first member, and fluid pressure actuated means for moving said third members transversely of the axis of rotation of said first member; second power actuated means for moving said second members longitudinally of the axis of rotation of said first member; said second drum section comprising; a plurality of circumferentially oriented fourth members slidably supported for movement in linear paths transversely of the axis of rotation of said first member and having rack teeth thereon, a plurality of fifth members having arcuate external surfaces disposed concentrically of the axis of rotation of said first member connected to said fourth members and forming a cylindrical continuous or a substantially cylindrical and continuous surface engaging the interior of said expansible and contractable member adjacent the central part thereof, and power actuated gear means in mesh with said rack teeth of said fourth members for moving said fifth members transversely of the axis of rotation of said first member; control means for actuating said first fluid pressure actuated means and said gear means to move simultaneously said third and fifth members in stages or steps of predetermined amount in their respective said linear paths transversely of the axis of rotation of said first member to expand or contract said expansible and contractable member; and control means for actuating said second power actuated means and said gear means to move simultaneously and in predetermined relation to one another said second members of said first and third drum sections and said third members connected thereto towards said second drum section and said fifth members in their respective said linear paths transversely of the axis of rotation of said first member to expand or contract the part of said expansible and contractable member between its ends.

4. In apparatus for use in building pneumatic tires including radial and/or belted tires: a selectably rotatable first member; a tire building drum including first, second and third expansible and contractable drum sections axially arranged on said first member with said second section intermediate said first and third sections; an expansible and contractable member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said expansible and contractable member adjacent an end thereof, first means connecting said third members to said second member for movement in linear paths transversely of the axis of rotation of said first member, and fluid pressure actuated means for moving said third members in said linear paths transversely of the axis of rotation of said first member; second power actuated means for moving said second members longitudinally of the axis of rotation of said first member, said second drum section comprising: a plurality of circumferentially oriented fourth members slidably supported for movement in linear paths transversely of the axis of rotation of said first member and having rack teeth thereon, a plurality of assemblies connected to said fourth members, each of said assemblies comprising a plurality of axially spaced circumferentially extending plate-like fifth members having their opposite ends interposed between adjacent ends of said plate-like fifth members of adjoining assemblies and arcuate external surfaces disposed circumferentially of the axis of rotation of such first members to form a cylindrical continuous or a substantially cylindrical and continuous surface engaging the interior of said expansible and contractable member adjacent the central part thereof, and power actuated gear means in mesh with said rack teeth of said fourth members for moving said fourth members in their respective said linear paths and said assemblies transversely of the axis of rotation of said first member; control means for actuating said first fluid pressure actuated means and said power actuated gear means to move simultaneously said third and fourth members and said assemblies connected to said fourth members in stages or steps of predetermined amount in their respective said linear paths transversely of the axis of rotation of said first member to expand or contract said expansible and contractable member: and control means for actuating said second power actuated means and said gear means to move simultaneously and in predetermined relation to one another said second members of said first and third drum sections and said third members connected thereto towards said second drum section and said fourth members and said assemblies connected thereto in their respective said linear paths transversely of the axis of rotation of said first member to expand or contract the part of said expansible and contractable member between its ends.

5. In apparatus for use in building pneumatic tires including radial and/or belted tires: a selectably rotatable first member; a plurality of circumferentially oriented discrete assemblies supported by said first member for movement transversely of the axis of rotation of said first member and having rack teeth thereon; said assemblies having arcuate external surfaces disposed circumferentially of the axis of rotation of said first member forming a cylindrical continuous or a substantially cylindrical and continuous surface; power actuated gear means in mesh with said rack teeth of said assemblies for moving said assemblies transversely of the axis of rotation of said first member; and control means for actuating said power actuated gear means to move simultaneously said assemblies in a plurality of stages or steps of predetermined amounts transversely of the axis of rotation of said first member to expand or contract said cylindrical surface.

6. In apparatus for use in building pneumatic tires including radial and/or belted tires: a selectably rotatable first member; a plurality of circumferentially oriented discrete assemblies slidably supported for movement transversely of the axis of rotation of said first member and having rack teeth thereon; each of said assemblies comprising a plurality of axially spaced circumferentially extended plate-like members having their opposite ends interposed between adjacent ends of said plate-like members of adjoining assemblies and arcuate external surfaces disposed circumferentially of the axis of rotation of said first member to form a cylindrical continuous or substantially cylindrical and continuous surface; power actuated gear means in mesh with said rack teeth for moving said assemblies transversely of the axis of rotation of said first member; and control means for actuating said power actuated gear means to move simultaneously said assemblies in a plurality of stages or steps of predetermined amount transversely of the axis of rotation of said first member to expand or contract said cylindrical surface.

7. In apparatus for use in building pneumatic tires including radial and/or belted tires: a selectably rotatable first member; a second member supported on said first member for movement lengthwise of the axis of rotation of said first member; a plurality of circumferentially oriented third members slidably supported by said second member for movement in linear paths transversely of the axis of rotation of said first member; a plurality of fourth members having arcuate external surfaces disposed concentrically of the axis of rotation of said first member forming a cylindrical continuous or a substantially cylindrical and continuous surface connected to said third members; a plurality of first and second tandem fluid pressure actuated reciprocating type motors radially positioned with respect to the axis of rotation of said first member connected between said second and third members for moving said third members in said linear paths and thereby said fourth members connected thereto transversely of the axis of rotation of said first member; and control means for actuating said first and second fluid pressure actuated motors in sequence to move simultaneously said third members and said fourth members connected thereto in a plurality of stages or steps of predetermined amounts transversely of the axis of rotation of said first member to expand or contract said cylindrical surface.

8. In apparatus for use in building pneumatic tires including radial and/or belted tires: a selectably rotatable first member; a tire buidlign drum including first, second and third expansible and contractable drum sections axially arranged on said first member with said second section intermediate said first and third sections; a tubular elastomer member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said elastomer member adjacent an end thereof, first means connecting said third members to said second member for movement transversely of the axis of rotation of said first member, first power actuated means for moving said third members transversely of the axis of rotation of said first member; means fixedly connecting the ends of said elastomer member to a plurality of said third members of each of said first and third drum sections; said second drum section comprising: a plurality of assemblies connected to said first member for movement transversely of the axis of rotation of said first member, said assemblies having rack teeth thereon and arcuate external surfaces disposed concentrically of the axis of rotation of said first member forming a cylindrical continuous or a substantially cylindrical and continuous surface engaging the interior of said elastomer member adjacent the center thereof, and power actuated gear means in mesh with said rack teeth for moving said assemblies transversely of the axis of rotation of said first member; control means for actuating said first power actuated means and said power actuated gear means to move simultaneously said third members and said assemblies transversely of the axis of rotation of said first member to expand or contract siad elastomer member; and control means for actuating said power actuated gear means to move simultaneously and in predetermined relation to one another said assemblies transversely of the axis of rotation of said first member to expand or contract the center part of said elastomer member.

9. In apparatus for use in building pneumatic tires including radial and/or belted tires: a selectably rotatable first member; a tire building drum including first, second and third expansible and contractable drum sections axially arranged on said first member with said second section intermediate said first and third sections; a tubular elastomer member surrrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said elastomer member adjacent an end thereof, first means connecting said third members to said second member for movement transversely of the axis of rotation of said first member, and first power actuated means for moving said third members transversely of the axis of rotation of said first member; second means fixedly connecting the ends of said elastomer member to a plurality of said third members of each of said first and third drum sections; said second drum section comprising: a plurality of circumferentially oriented assemblies supported for movement transversely of the axis of rotation of said first member, each of said assemblies comprising a plurality of axially spaced circumferentially extending plate-like members having their opposite ends interposed between adjacent ends of said plate-like members of adjoining assemblies and arcuate external surfaces disposed circumferentially of the axis of rotation of said first member to form a cylindrical continuous or a substantially cylindrical and continuous surface engaging the interior of said elastomer member adjacent the central part thereof and fourth members having rack teeth thereon; power actuated gear means in mesh with said rack teeth for moving said assemblies transversely of the axis of rotation of said first member; control means for actuating said first power actuated means and said power actuated gear means to move simultaneously said third members and said assemblies transversely of the axis of rotation of said first member to expand or contract said elastomer member; and control means for actuating said power actuated gear means to move simultaneously and in relation to one another said assemblies transversely of the axis of rotation of said first member to expand or contract the part of said elastomer member between its ends.

10. In apparatus for use in building pneumatic tires including radial and/or belted tires: a selectably rotatable first member; a tire building drum including first, second and third expansible and contractable drum sections axially arranged on said first member with said second section intermediate said first and third sections; an elastomer member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said elastomer member adjacent an end thereof, first means connecting said third members to said second member for movment in linear paths transversely of the axis of rotation of said first member, and first power actuated means for moving said third members transversely of the axis of rotation of said first member; second means fixedly connecting the ends of said elastomer member to a plurality of said third members of each of said first and third drum sections; said second drum section comprising: a plurality of circumferentially oriented assemblies supported for movement in linear paths transversely of the axis of rotation of said first member, each of said assemblies comprising a plurality of axially spaced circumferentially extending plate-like members having their opposite ends interposed between adjacent ends of said plate-like members of adjoining assemblies and arcuate external surfaces disposed circumferentially of the axis of rotation of said first member to form a cylindrical continuous or substantially cylindrical and continuous surface engaging the interior of said elastomer member adjacent the central part thereof and fourth members having rack teeth thereon; power actuated gear means in mesh with said rack teeth for moving said assemblies in said linear paths transversely of the axis of rotation of said first member; control means for actuating said first power actuated means and said power actuated gear means to move simultaneously said third members and said assemblies predetermined amounts in their respective said linear paths transversely of the axis of rotation of said first member to expand or contract said member; and control means for actuating said power actuated gear means to move simultaneously and in predetermined relation to one another said assemblies in their respective said linear paths transversely of the axis of rotation of said first member to expand or contract the part of said elastomer member between its ends.

11. In apparatus for use in building pneumatic tires including radial and/or belted tires: a selectably rotatable first member; a tire building drum including first, second and third expansible and contractable drum sections axially arranged on said first member with said second section intermediate said first and third sections; an elastomer member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said elastomer member adjacent an end thereof, first means connecting said third members to said second member for movement in linear paths transversely of the axis of rotation of said first member, and first power actuated means for moving said third members in said linear paths transversely of the axis of rotation of said first member; second means fixedly connecting the ends of said elastomer member to a plurality of said third members of each of said first and third drum sections; said second drum section comprising: a plurality of circumferentially oriented assemblies slidably supported for movement in linear paths transversely of the axis of rotation of said first member, each of said assemblies comprising a plurality of axially spaced circumferentially extending plate-like members having their opposite ends interposed between adjacent ends of said plate-like members of adjoining assemblies and arcuate external surfaces disposed circumferentially of the axis of rotation of said first member to form a cylindrical continuous or substantially cylindrical and continuous surface engaging the interior of said elastomer member adjacent the central part thereof and fourth members having rack teeth thereon; power actuated gear means in mesh with said rack teeth for moving said assemblies in said linear paths transversely of the axis of rotation of said first member; control means for actuating said first power actuated means and said power actuated gear means to move simultaneously said third members and said assemblies in stages or steps in their respective said linear paths transversely of the axis of rotation of said first member to expand or contract said elastomer member; and control means for actuating said power actuated gear means to move simultaneously and in predetermined relation to one another said assemblies in thier respective said linear paths transversely of the axis of rotation of said first member to expand or contract the part of said elastomer member between its ends.

12. In apparatus for use in building pneumatic tires including radial and/or belted tiers: a selectably rotatable first member; a tire building drum including first, second and third expansible and contractable drum sections axially arranged on said first member with said second section intermediate aid first and third sections; an elastomer member surrounding said drum sections; each of said first and third drum sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or substantially cylindrical and continuous surface engaging the interior of said elastomer member adjacent an end thereof, first means connecting said third members to said second member for movement transversely of the axis of rotation of said first member, and fluid pressure actuated means for moving said third members transversely of the axis of rotation of said first member; second means fixedly connecting the ends of said elastomer member to a plurality of said third members of each of said first and third drum sections; said second drum section comprising: a plurality of circumferentially oriented assemblies having rack teeth thereon and arcuate external surfaces disposed concentrically of the axis of rotation of said first member forming a cylindrical continuous or a substantially cylindrical and continuous surface; power actuated gear means connected to said rack teeth of said assemblies for moving said assemblies transversely of the axis of rotation of said first member; control means for actuating said fluid pressure actuated means and said power actuated gear means to move simultaneously said third members and said assemblies in predetermined amounts transversely of the axis of rotation of said first member to expand or contract said elastomer member; and control means for actuating said power actuated gear means to move simultaneously and in predetermined relation to one another said assemblies transversely of the axis of rotation of said first member to expand or contract the part of said elastomer member between its ends.

13. In apparatus for use in building pneumatic tires including radial and/or belted tires; a selectably rotatable first member; a tire building drum including first, second and third expansible and contractable drum sections axially arranged on said first member with said second section intermediate said first and third sections; an expansible and contractable member surrounding said drum sections; each of said first and third sections comprising: a second member supported by said first member for movement lengthwise of the axis of rotation of said first member, a plurality of circumferentially oriented third members having arcuate external surfaces disposed concentrically of the axis of rotation of said first member forming a cylindrical continuous or a substantially cylindrical and continuous surface engaging the interior of said expansible and contractable member adjacent an end thereof, first means connecting said third members to said second member for movement in linear paths transversely of the axis of rotation of said first member, and first power actuated means for moving said third members in said linear paths; said second drum section comprising: a plurality of fourth members having rack teeth thereon, second means slidably supporting said fourth member in said first member for movement in linear paths offset from and extending transversely of the axis of rotation of said first member, a plurality of said fourth members being located relative to one another both angulary and axially with respect to the axis of rotation of said first member, a plurality of circumferentially oriented fifth members connected to said fourth members and having arcuate external surfaces disposed concentrically of the axis of rotation of said first member forming a cylindrical continuous or a substantially cylindrical and continuous surface engaging the interior of said expansible and contractable member adjacent the central part thereof; power actuated gear means in mesh with said rack teeth for moving said fourth members in said linear paths; control means for actuating said first power actauted means and said power actuated gear means to move simultaneously said third and fourth members in their respective said linear paths to expand said expansible and contractable member; and control means for actuating said power actuated gear means to move said fourth members in their respective said linear paths to expand the part of said expansible and contractable members between its ends.

* * * * *

PO-1050
(5/69)

UNITED STATES PATENT OFFICE
CERTIFICATE OF CORRECTION

Patent No. 3,765,987          Dated October 16, 1973

Inventor(s) WILHELM BREY

It is certified that error appears in the above-identified patent and that said Letters Patent are hereby corrected as shown below:

Col. 9, line 12, "sahft" to --shaft--;

Col. 9, line 59, "rotatag" to --rotating--;

Col. 14, line 65, "buidlign" to --building--

Col. 15, line 47, "surrrounding" to --surrounding--;

Col. 16, line 11, "actauted" to --actuated--;

Col. 16, line 41, "movment" to --movement--;

Col. 17, line 58 "thier" to --their--;

Col. 17, line 68, "aid" to --said--;

Col. 20, line 1, "actauted" to --actuated--;

Signed and sealed this 19th day of February 1974

(SEAL)
Attest:

EDWARD M. FLETCHER, JR.          C. MARSHALL DANN
Attesting Officer          Commissioner of Patents